3,266,988
METHOD OF PRODUCING ANTI-ADRENAL
ACTIVITY
Harry L. Saunders, Willow Grove, Pa., assignor to Smith
Kline & French Laboratories, Philadelphia, Pa., a corporation of Pennsylvania
No Drawing. Filed Oct. 10, 1963, Ser. No. 315,408
8 Claims. (Cl. 167—65)

This invention relates to pharmaceutical preparations having adrenal inhibitory properties and to a method of producing anti-adrenal activity.

More specifically the pharmaceutical preparations and method of this invention can be used therapeutically in edematous states such as cirrhosis of the liver, nephrosis, congestive heart failure and malignant hypertension accompanied by hyperaldosteronism. In these conditions the evidence for the role played by aldosterone and deoxycorticosterone is based on the increased tubular reabsorption of sodium, a reduced sodium and increased potassium in sweat and feces and varying degrees of hypopotassemia following the administration of diuretics. Furthermore, diuresis occurs following bilateral adrenalectomy and following the administration of adrenal inhibitors.

The novel medicinal compositions of this invention are unique in that they block the production of adrenal steroids. Such activity has never been described for compounds of the chemical class described hereafter.

Further, the active ingredient of these compositions is rapidly absorbed from the gastrointestinal tract after oral administration with remarkably low toxicity within the dose ranges set forth hereinafter.

Most advantageously the compositions of this invention are in dosage unit form and comprise a nontoxic pharmaceutical carrier and a trifluoromethylbenzhydryl ether which has the following structural formula:

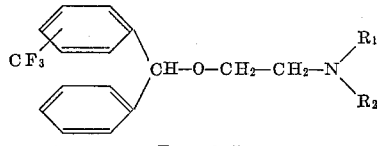

Formula I in which $R_1$ and $R_2$ represent hydrogen, lower alkyl groups having not in excess of 4 carbon atoms, or when taken together with the nitrogen forms a five to seven membered heterocyclic amino group, such as for example, pyrrolidyl, pyridinyl, morpholinyl, piperidinyl or N-methyl-piperazinyl.

Preferably the trifluoromethylbenzhydryl ether ingredients are those represented by Formula I in which $R_1$ and $R_2$ represent hydrogen and lower alkyl groups having not in excess of four carbon atoms.

Most advantageously the compositions of this invention in dosage unit form comprise a nontoxic pharmaceutical carrier combined with 2-(p-trifluoromethylbenzhydryloxy)-N,N-dimethylethylamine or one of its acceptable acid addition salts.

The basically substituted trifluoromethylbenzhydryl ethers as illustrated in Formula I and present in these novel compositions are prepared by condensing trifluoromethylbenzhydrol with the β-substituted dialkylaminoethyl halide or the aminoethyl halide of the desired heterocyclic ring in toluene in the presence of a binding agent, such as for example, sodamide. An alternative method is condensing trifluoromethylbenzhydryl halide with the properly substituted aminoethanol under the above conditions.

A nontoxic pharmaceutically acceptable organic or inorganic acid addition salt of the base may be used instead of the base. Preferably the hydrochloride salt is used. However, other salts such as those derived from sulfuric, nitric, phosphoric, citric, acetic, lactic, mandelic, salicyclic, phthalic, fumaric, maleic, hydrobromic, benzoic and like nontoxic acids may be used. The salts are best prepared by reacting the free base with a stoichiometric amount of the desired organic or inorganic acid in a suitable solvent such as ethyl acetate-ether solution, ethanol, acetone, water or various combinations of solvents.

The pharmaceutical carrier employed may be, for example, either a solid or liquid. Exemplary of solid carriers are lactose, terra alba, sucrose, talc, gelatin, agar, pectin, acacia magnesium stearate, stearic acid and the like. Exemplary of liquid carriers are syrup, peanut oil, olive oil, water and the like. Similarly the carrier or diluent include any time delay material well known to the art, such as, glyceryl monostearate or glyceryl distearate alone or with a wax.

A wide variety of pharmaceutical forms can be employed. Thus, if a solid carrier is used the preparation can be tableted, placed in a hard gelatin capsule in powder or pellet form or in the form of a troche or lozenge. The amount of solid carrier will vary widely but preferably will be from about 25 mg. to about 1 gm. If a liquid carrier is used, the preparation will be in the form of a syrup, emulsion, soft gelatin capsule, ampule or liquid suspension.

The method in accordance with this invention comprises administering internally to an animal organism a compound as represented by the above formula or a nontoxic addition salt thereof usually combined with a pharmaceutical carrier, for example, any of the above compositions in an amount sufficient to produce anti-adrenal activity. The active medicament preferably will be, per unit of base, in an amount of from about 10 mg. to about 150 mg. and advantageously from about 25 mg. to about 100 mg. The administration may be parenterally or orally, the latter being the preferable route of administration. Advantageously equal doses will be administered one to four times daily. Preferably the daily dosage will be from 10 mg. to about 600 mg. and most advantageously from about 30 mg. to about 250 mg. of active medicament in pharmaceutical forms. When the administration described above is carried out anti-adrenal activity is effectively achieved.

In veterinary practice, the preparations can be given per se or as an additive to the feed or drinking matter of animals.

These preparations are made following the conventional techniques of the pharmaceutical chemist involving mixing, granulating and compressing when necessary or variously mixing and dissolving the ingredients as appropriate to the desired end product.

The following examples are not limiting but are illustrative of pharmaceutical preparations of this invention.

*Example 1*

Under a nitrogen atmosphere a stirred solution containing 9.6 g. of magnesium shavings, 2 ml. of ethyl bromide and 50 ml. of dry ether is slowly treated with a solution consisting of 90 g. of bromobenzotrifluoride in 1 l. of dry ether. The mixture is refluxed for an additional hour after completion of addition. The reaction mixture is cooled to room temperature and 34.4 g. of benzaldehyde in ether is added. Refluxing is continued for approximately 20 hours, mixture is cooled and 500 ml. of 20% ammonium chloride added. The ether layer is separated and the aqueous layer is extracted with ether. The ether fractions are then combined, dried over magnesium sulfate, concentrated under reduced pressure and allowed to solidify while standing overnight at —20° C. The solid is then dissolved in petroleum ether and after the filtrate is treated with activated charcoal it is concentrated to yield p-trifluoromethylbenzhydrol as a white solid.

A mixture of 240 ml. of sodium dried toluene and 8.4 g. of sodamide is placed in a flask and vigorously stirred. To this is added 54 g. of p-trifluoromethylbenzhydrol in 240 ml. of toluene with refluxing until ammonia is no longer evident. A solution of 35.2 g. of dimethylaminoethyl chloride in 60 ml. of toluene is added with continued refluxing. The reaction mixture is then treated with 100 ml. of water and the pale yellow toluene layer extracted again with 100 ml. of water. The combined aqueous fractions are then back-extracted with toluene. The combined toluene layers are dried over magnesium sulfate, concentrated under reduced pressure and distilled to give the free base, 2-(p-trifluoromethylbenzhydryloxy)-N,N-dimethylethylamine.

The hydrochloride salt is prepared by dissolving the base in ether and reacting with additional ether saturated with hydrogen chloride. Recrystallization from ethanol-ether yields crystals having a melting point of 167.5 to 168.5.

*Example 2*

Ingredients: Amounts, mg.
2 - (p - trifluoromethylbenzhydryloxy)-N,N-
  dimethylethylamine hydrochloride _____ 25.00
Calcium sulfate dihydrate _____ 125.00
Sucrose _____ 25.00
Starch _____ 15.00
Talc _____ 5.00
Stearic acid _____ 3.00

The sucrose, calcium sulfate and 2-(p-trifluoromethylbenzhydryloxy) - N,N - dimethylethylamine hydrochloride are thoroughly mixed and granulated with hot 10% gelatin solution. The wetted mass is passed through a #6 mesh screen directly onto drying trays. The granules are dried at 120° F. and passed through a #20 mesh screen, mixed with the starch, talc and stearic acid and compressed into tablets. One tablet is administered four times a day.

*Example 3*

Ingredients: Amounts, mg.
2 - (p - trifluoromethylbenzhydryloxy)-N,N-
  dimethylethylamine hydrochloride _____ 50.00
Lactose _____ 100.00

Screen above ingredients through a #40 mesh screen, mix well and fill into a #1 hard gelatin capsule. One capsule is administered three times daily.

*Example 4*

Ingredients: Amounts, mg.
2 - (p - trifluoromethylbenzhydryloxy)-N,N-
  diethylethylamine hydrochloride _____ 100.00
Magnesium stearate _____ 5.00
Lactose _____ 400.00

Screen above ingredients through a #40 mesh screen, mix well and fill into a #0 hard gelatin capsule. One capsule is administered three times a day.

*Example 5*

Ingredients: Amounts, mg.
2 - (p - trifluoromethylbenzhydryloxy)ethyl-
  amine sulfate _____ 10.00
Calcium sulfate, dihydrate _____ 125.00
Sucrose _____ 25.00
Starch _____ 15.00
Talc _____ 5.00
Stearic acid _____ 3.00

The sucrose, calcium sulfate and 2-(p-trifluoromethylbenzhydryloxy)ethylamine sulfate are thoroughly mixed and granulated with hot 10% gelatin solution. The wetted mass is passed through a #6 mesh screen directly onto drying trays. The granules are dried at 120° F. and passed through a #20 mesh screen. These granules are then mixed with the starch, talc and stearic acid, passed through a #60 mesh screen and compressed into tablets.

*Example 6*

Ingredients: Amounts, mg.
2 - (p - trifluoromethylbenzhydryloxy)-N,N-
  dimethylethylamine _____ 150.00
Peanut oil _____ 200.00

The ingredients are mixed to a thick slurry and filled into a soft gelatin capsule. One capsule is administered four times a day.

What is claimed is:

1. A nontoxic pharmaceutical composition for adrenal inhibition, in dosage unit form adapted for internal administration, comprising a pharmaceutical carrier and from about 10 mg. to about 150 mg. of a compound selected from the group consisting of a free base and its nontoxic, pharmaceutically acceptable acid addition salts, said free base having the formula:

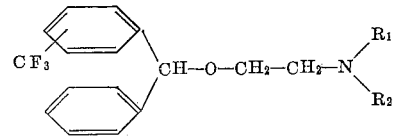

in which $R_1$ and $R_2$ are members selected from the group consisting of hydrogen and lower alkyl having not in excess of four carbon atoms and when taken together with the nitrogen forms a five to seven membered heterocyclic amino group.

2. A nontoxic pharmaceutical composition for adrenal inhibition, in dosage unit form adapted for internal administration, comprising a pharmaceutical carrier and from about 10 mg. to about 150 mg. of 2-(p-trifluoromethylbenzhydryloxy)-N,N-dimethylethylamine in the form of one of its nontoxic pharmaceutically acceptable acid addition salts.

3. A nontoxic pharmaceutical composition for adrenal inhibition, in dosage unit form adapted for internal administration, comprising a pharmaceutical carrier and from about 10 mg. to about 150 mg. of 2-(p-trifluoromethylbenzhydryloxy) - N,N - dimethylethylamine hydrochloride.

4. The method of producing adrenal inhibition activity which comprises internally administering to an animal organism in an amount sufficient to produce such activity a compound selected from the group consisting of a free base and its nontoxic pharmaceutically acceptable acid addition salts, said free base having the formula:

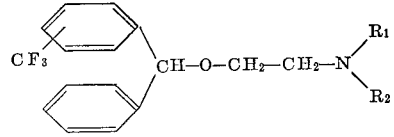

in which $R_1$ and $R_2$ are members selected from the group consisting of hydrogen and lower alkyl having not in excess of four carbon atoms and when taken together with the nitrogen forms a five to seven membered heterocyclic amino group.

5. The method of producing adrenal inhibition activity which comprises internally administering to an animal organism from one to four times daily a dosage unit of from about 10 mg. to about 150 mg. of a compound selected from the group consisting of a free base and its nontoxic pharmaceutically acceptable acid addition salts, said free base having the formula:

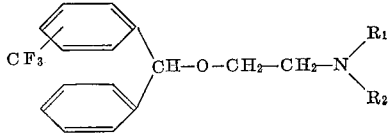

in which $R_1$ and $R_2$ are members selected from the group consisting of hydrogen and lower alkyl having not in excess of four carbon atoms and when taken together with the nitrogen forms a five to seven membered heterocyclic amino group.

6. The method of producing adrenal inhibition activity which comprises internally administering to an animal organism in an amount sufficient to produce said activity 2-(p-trifluoromethylbenzhydryloxy)-N,N-dimethylethylamine.

7. The method of producing adrenal inhibition activity which comprises internally administering to an animal organism a daily dosage regimen of from about 10 mg. to about 600 mg. of a member selected from the group consisting of 2-(p-trifluoromethylbenzhydryloxy)-N,N-dimethylethylamine and its nontoxic pharmaceutically acceptable acid addition salts.

8. The method in accordance with claim 7 wherein said member is 2-(p-trifluoromethylbenzhydryloxy)-N,N-dimethylethylamine hydrochloride.

No references cited.

JULIAN S. LEVITT, *Primary Examiner.*

MARTIN J. COHEN, *Assistant Examiner.*